United States Patent
Newton et al.

(10) Patent No.: US 9,260,203 B2
(45) Date of Patent: Feb. 16, 2016

(54) SYSTEM AND METHOD FOR MATCHING OF SPACE LAUNCH, SATELLITE, AND MISSION PAYLOAD OPPORTUNITIES

(71) Applicant: OMNI Consulting Solutions LLC, El Segundo, CA (US)

(72) Inventors: Keith C. Newton, El Segundo, CA (US); Frank Conn, Hermosa Beach, CA (US); Thomas Francis Flynn, Jr., Huntington Beach, CA (US)

(73) Assignee: OMNI Consulting Solutions, LLC, El Segundo, CA (US)

( * ) Notice: Subject to any disclaimer, the term of this patent is extended or adjusted under 35 U.S.C. 154(b) by 0 days.

(21) Appl. No.: 14/247,512

(22) Filed: Apr. 8, 2014

(65) Prior Publication Data

US 2015/0284109 A1    Oct. 8, 2015

(51) Int. Cl.
| | |
|---|---|
| *B64C 37/02* | (2006.01) |
| *B64D 39/00* | (2006.01) |
| *B64G 1/00* | (2006.01) |
| *B64G 1/10* | (2006.01) |

(52) U.S. Cl.
CPC . *B64G 1/002* (2013.01); *B64G 1/10* (2013.01)

(58) Field of Classification Search
CPC .......... B64G 1/002; B64G 1/402; B64G 1/50; B64G 1/1014; B64G 1/641; F41G 7/006; G01S 5/0036; B64C 37/02; B64B 1/54; B64D 39/00
USPC .......... 701/3; 244/2, 171.3, 171.8; 342/357.31
See application file for complete search history.

(56) References Cited

U.S. PATENT DOCUMENTS

| | | | | |
|---|---|---|---|---|
| 5,203,844 | A * | 4/1993 | Leonard | B64G 1/002 244/171.3 |
| 5,295,642 | A * | 3/1994 | Palmer | B64D 39/00 244/171.4 |
| 5,450,317 | A | 9/1995 | Lu et al. | |
| 5,631,827 | A | 5/1997 | Nicholls et al. | |
| 5,739,787 | A * | 4/1998 | Burke | F41G 7/006 244/3.2 |
| 5,794,207 | A | 8/1998 | Walker et al. | |

(Continued)

FOREIGN PATENT DOCUMENTS

| | | |
|---|---|---|
| EP | 2262673 | 12/2010 |
| WO | WO-02/07045 | 1/2002 |

(Continued)

OTHER PUBLICATIONS

Hackett, John et al., "Sapphire-like Payload for Space Situational Awareness", http://www.amostech.com/TechnicalPapers/2012/POSTER/HACKETT.pdf.

(Continued)

*Primary Examiner* — Tuan C. To
*Assistant Examiner* — Yuri Kan
(74) *Attorney, Agent, or Firm* — Tsircou Law, P.C.

(57) ABSTRACT

A system and a related method are disclosed for matching space launch vehicle, satellite, and mission hosted payload opportunities utilizing multi-level, priority algorithms. The potential matches include numerous mission-matching scenarios, e.g., 1) matching hosted payload and host spacecraft, and 2) matching spacecraft(s) and launch opportunities, to include rideshare opportunities. The matching opportunities can be pursued by any interested project team, e.g., hosted payload, spacecraft, and space launch vehicle.

15 Claims, 5 Drawing Sheets

(56) References Cited

U.S. PATENT DOCUMENTS

| | | | |
|---|---|---|---|
| 6,064,981 A | 5/2000 | Barni et al. | |
| 6,219,653 B1 | 4/2001 | O'Neill et al. | |
| 6,321,207 B1 | 11/2001 | Ye | |
| 6,915,268 B2 | 7/2005 | Riggs et al. | |
| 6,970,825 B1 | 11/2005 | Altendahl et al. | |
| 7,746,813 B2 * | 6/2010 | Yamagiwa | H04Q 11/0478 370/310.2 |
| 7,783,557 B2 | 8/2010 | Laurent et al. | |
| 7,904,352 B2 | 3/2011 | Carruthers | |
| 8,321,356 B2 | 11/2012 | Amaida et al. | |
| 8,374,898 B2 | 2/2013 | El-Bakry et al. | |
| 2002/0049622 A1 * | 4/2002 | Lettich | G06Q 10/08 705/7.11 |
| 2002/0065738 A1 | 5/2002 | Riggs et al. | |
| 2002/0087584 A1 * | 7/2002 | Hung | H04M 1/72547 |
| 2007/0057083 A1 * | 3/2007 | Bolz | B05B 7/0012 239/34 |
| 2007/0162360 A1 | 7/2007 | Congram et al. | |
| 2008/0135687 A1 * | 6/2008 | Penzo | B64G 1/641 244/173.1 |
| 2012/0245836 A1 | 9/2012 | White et al. | |
| 2012/0274507 A1 | 11/2012 | Cherkaoui et al. | |
| 2013/0031017 A1 | 1/2013 | LaVoie et al. | |
| 2013/0037650 A1 * | 2/2013 | Heppe | B64C 37/02 244/2 |
| 2013/0080206 A1 | 3/2013 | LaVoie et al. | |
| 2015/0069187 A1 * | 3/2015 | McKinnon | B64G 1/50 244/171.8 |

FOREIGN PATENT DOCUMENTS

| | | |
|---|---|---|
| WO | WO-2005/060413 | 7/2005 |
| WO | WO 2008/079385 | 7/2008 |

OTHER PUBLICATIONS

Northern Sky Research, "Hosted Payloads on Commercial Satellites", http://www.nsr.com/research-reports/satellite-communications/hosted-payloads-on-commercial-satellites-2/.

Schueler, Carl "Commercially Hosted Payloads: Low-Cost Research to Operations", https://ams.confex.com/ams/93Annual/webprogram/Paper224173.html.

* cited by examiner

70

OMNIVIEW      User A (logout)

HOME     Request     Submit

User A     Pending Requests (15)    Pending Submissions (8)    Messages (3)

Request

- Find host spacecraft match for hosted payload
- Find launch vehicle rideshare match for spacecraft
- Find payload match for launch vehicle
- Find spacecraft match for payload Input

- Input host spacecraft match for hosted payload
- Input launch vehicle rideshare match for spacecraft
- Input payload match for launch vehicle
- Input spacecraft match for payload

OMNIVIEW      User A (logout)

HOME     Request     Submit

User A     Pending Requests (15)    Pending Submissions (8)    Messages (3)

| Owner/Operator | Category | Launch Classification |
|---|---|---|
| -- select -- | Launch Vehicles | FOUO |

| Launch Site | Satellite Name | Launch Year |
|---|---|---|
| -- select -- | | |

| Launch Vehicle Type | Launch Vehicle | |
|---|---|---|
| Missile | | |

Update

FIG. 5

SYSTEM AND METHOD FOR MATCHING OF SPACE LAUNCH, SATELLITE, AND MISSION PAYLOAD OPPORTUNITIES

FIELD OF THE INVENTION

This invention relates to space hosting and rideshare mission planning and, more particularly, to matching space-payload opportunities utilizing technical and mission requirements to generate pairing opportunities between matching payloads, space and sub-orbital launch rideshare, and spacecraft hosting opportunities.

BACKGROUND OF THE INVENTION

Sending space systems into orbit is technically challenging and unforgiving, where even the most minute miscalculation or anomaly can result in a failed launch or even the destruction of costly satellites. As such, factors such as performance characteristics and launch reliability are driving considerations for government and commercial users. However, these factors tend to adversely influence other important concerns such as launch schedule and cost. Thus, access to space continues to be a challenging endeavor. Nonetheless, as communications and sensor technologies continue to develop, the demand for affordable space access will grow.

For decades, NASA and the Department of Defense have funded numerous initiatives focusing primarily on reducing the cost of access to space. However, launch costs continue to be a challenge, which suggests that focusing solely on the development of lower-cost launch services on its own is not sufficient to meet the ever-increasing commercial and government demand for access to space.

Typically, satellite system owners purchase access to a launch vehicle in order to obtain access to space. The extraordinary costs associated with launch vehicles make it cost prohibitive for small companies and budget restricted government agencies to gain access to space. This unavoidable constraint means alternative solutions to meeting demand and lowering cost is required.

Launch providers also face significant scheduling challenges. The launch provider must integrate a variety of mass and volumes in a dynamic launch environment, as well as adapt the launch profile to accommodate a wide range of orbital altitudes. The launch provider's desired efficiency level must be considered as well. Ideally, launch providers endeavor to schedule each launch to maximize the payload capacity. However, each scheduled launch necessarily runs the risk of less than ideal utilization due to potential complications or changing variables. Launch providers are hesitant to schedule a launch unless there is a high probability that all available capacity will be utilized. This also causes problems for launch providers designing new launch vehicles.

Current scheduling approaches also adversely affect access to space for many users. For example, design, manufacture, and testing of all the spacecraft need to be aligned to execute on an established schedule. The time required to take a project from the design phase to an operational launch can take many years in order to comply with designing a spacecraft for current or anticipated launch vehicle parameters. Additional complications arise when confirming payloads to lock in the launch manifest. Sometimes the companies seeking access to space encounter budget uncertainties, program cancellations, changes in business plan/scope, internal uncertainties, or the funding gates do not align with schedule requirements.

Current systems and methods are directed at scheduling secondary or hosted payloads to launch with primary payloads on spacecraft. A hosted payload is defined as a payload on a spacecraft that performs functions not attributed to the primary mission of the satellite. Usually, primary payloads must launch their spacecraft at a precise time in order to meet an increased commercial demand in communications, or to replace a timeworn satellite. In these scenarios, the primary mission may not require full use of the satellite's payload capacity in terms of size, weight, or power, underutilizing the value of the satellite to the owner/operator.

Often times, smaller companies wishing to send hosted payloads into space are waiting for numerous variables associated with their payload to align with the variables associated with the primary payload and its associated spacecraft. These variables include: preferred orbit, average payload power required, payload size (volume), payload mass, required on-orbit date, preferred field of view, and mission design life.

In the past, matching across space projects was a complicated endeavor, wrought with any number of pitfalls, to include schedule, budget, and performance risk. When such project matches have been pursued in the past, substantial coordination is required in development and transfer of information very early in the projects with the hopes of minimizing or reducing such risks. However, such information is rarely consolidated and substantial time and effort is required to assess the feasibility of potential matches, which distracts project members from primary duties or does not fully uncover the complete set of opportunities, further dissuading project managers from identifying and pursuing such opportunities.

Therefore, there exists a need for a system and method of pairing commercial or government payloads and spacecraft with space missions with available capacity in either launch or on-orbit hosting. The present invention fulfills these needs and others.

SUMMARY OF THE INVENTION

Briefly, and in general terms, the invention provides a system and, related method, for matching space launch, satellite, and mission (hosted) payload opportunities utilizing multi-level, priority algorithms. The potential matches include numerous mission-matching scenarios, e.g., 1) matching hosted payload and host spacecraft, and 2) matching spacecraft(s) and launch opportunities, to include rideshare opportunities. The matching opportunities can be pursued by any interested project team, e.g., hosted payload, spacecraft, and space launch vehicle.

More specifically, by example and not limitation, the system includes a database management system (DBMS) that maintains detailed data relating to space projects, including tiered level of program parameters. The system further includes modules to assess potential matches from numerous aspects, including a matching module, a costing module, a feasibility assessment module, and schedule risk module.

In a detailed aspect of an exemplary embodiment, the matching module utilizes a protocol of requirements that are categorized in several levels to conduct a match-priority valuation.

In another detailed aspect of an exemplary embodiment, the costing module can conduct a financial analysis for the proposed match generated by the matching module. The cost estimate can include a comparison of technical and mission inputs to enable trade decisions across the system and across the mission life cycle.

In yet another detailed aspect of an exemplary embodiment, the feasibility assessment module conducts a more detailed analysis of system parameters to create alternatives and insight into matching. The schedule risk module assigns a risk level to the mission based on the potential hosts and payload technical and mission hard and soft requirements as defined by the user. Hard requirements are must have and considered "Level 1". The user defines these as requirements that are inflexible based on the desired capabilities or design of the hosted payload, spacecraft, or launch vehicle. Soft requirements are defined as "Level 2" and considered flexible and can be adjusted to maximize the number of potential opportunities.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings, which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Embodiments of the present invention will now be described, by way of example only, with reference to the following drawings in which:

FIG. 4 is an exemplary graphical user interface (screenshot) provided to user device of the system of FIG. 1, depicting a sample homepage enabling users to select options for requesting opportunities (Request) for submitting mission information (Submit).

FIG. 5 is an exemplary graphical user interface (screenshot) provided to user device of the system of FIG. 1, depicting a sample input page enabling users to input and access mission information.

DETAILED DESCRIPTION OF THE PREFERRED EMBODIMENTS

Figure 1:
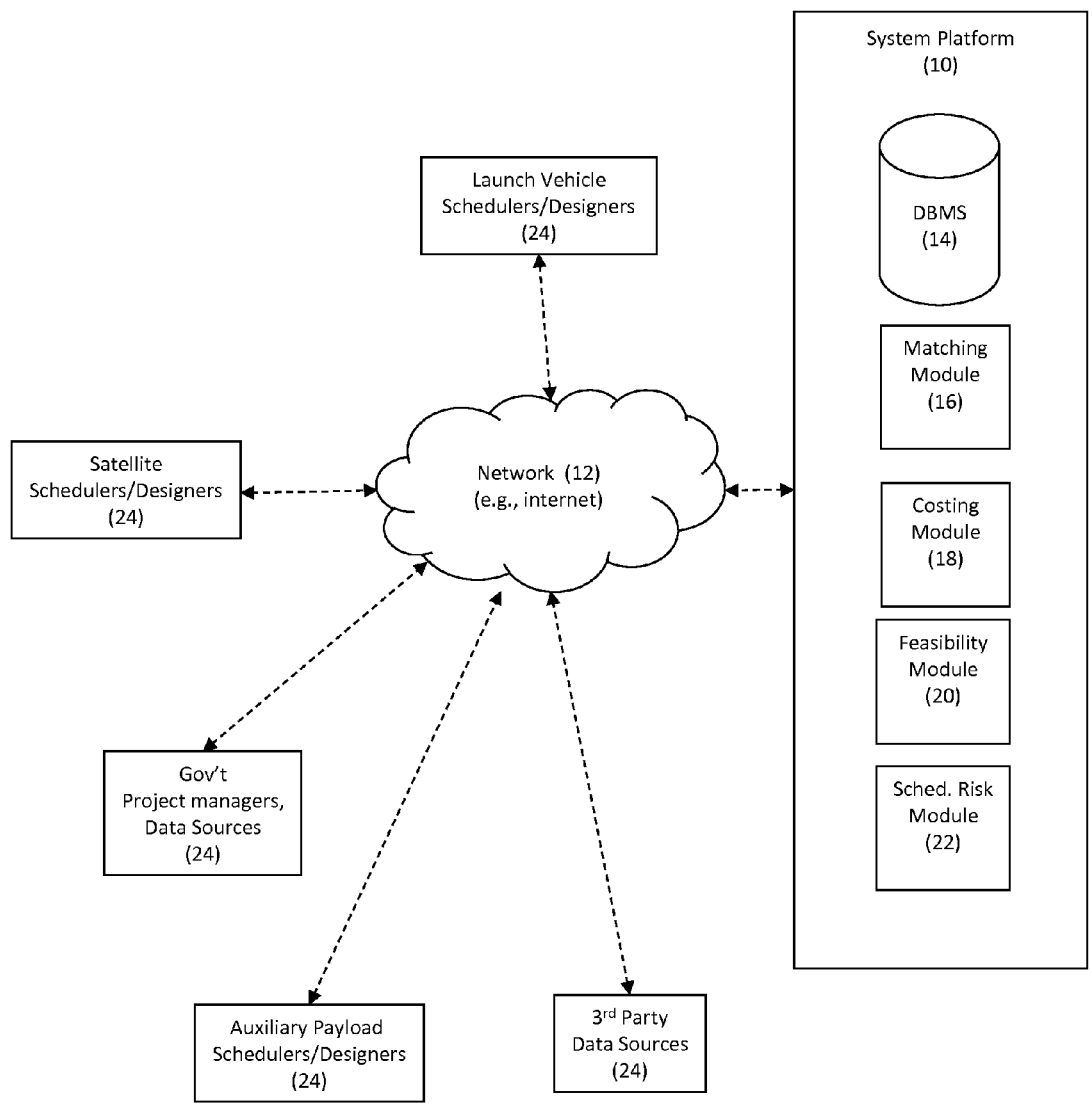
FIG. 1 is a simplified block diagram of a system in accordance with the invention.

With reference now to the drawings, there is shown a system and, related method, for matching space launch, satellite, and payload opportunities utilizing multi-level, priority algorithms. The system includes a database management system (DBMS) and a matching module, which is in communication via a controlled network, to enable users to access and provide proprietary or public schedule information, opportunity parameters, and other data. The matching module provides users with potential matches to enable the user to attain their mission requirement, across numerous mission-matching scenarios, e.g., 1) matching hosted payloads and host spacecraft(s), and 2) matching spacecraft(s) and launch opportunities, to include rideshare opportunities. Moreover, these matching opportunities can be pursued by any interested project team, e.g., primary or hosted payload, spacecraft, and space launch vehicle. The system provides a useful interface between commercial and government space projects as well as hybrids thereof.

Matching Hosted Payload and Host Spacecraft.

A hosted payload can be designed for various mission functions, such as, e.g., communications, scientific sensors, optical systems, and IR systems. A hosted payload often requires a host spacecraft to provide some or all spacecraft bus functions. Spacecraft bus functions can include power, thermal control, pointing/navigation and control, and communications system, among other functions. Depending on the configuration of the spacecraft and the hosted payload, the hosted payload can utilize some or all spacecraft functions.

The system provides payload mission architects with a landscape of future host spacecraft opportunities. In this manner, payload designers can take these factors in consideration in the design of the hosted payload to optimize the opportunity for securing a host spacecraft. Likewise, the system provides spacecraft designers with a landscape of future hosted payloads and their requirements. Thus, spacecraft designers can optimize spacecraft design to attract hosted payloads, which can offset associated design and launch costs. Similarly, a manager of a host spacecraft with extra capacity can utilize the system to identify opportunities for hosted payloads to utilize the host spacecraft.

Matching Spacecraft and Launch Opportunities, Including Rideshare.

All spacecraft require launch assistance to achieve orbit. Many spacecraft missions secure launch services directly from the launch provider, wherein the spacecraft is the primary payload for that specific launch. Such launches are designed to achieve a particular orbit on a launch schedule that satisfies the mission requirements for the primary payload. However, on many occasions, the launch vehicle has excess capacity and thus can accommodate additional payload(s) to a particular orbit along its trajectory on that launch schedule. Certain spacecraft missions that are not designed, budgeted, or otherwise prioritized as primary payloads can take advantage of this excess capacity in the form of a rideshare arrangement. The system enables such spacecraft managers to identify launch opportunities utilizing such excess launch capacity. Likewise, managers of launch vehicles and/or primary payloads can utilize the system to identify additional payloads for launch rideshare, which can aid in offsetting costs or increasing profitability.

With reference now to FIG. 1, the system platform 10 connects to system users and data sources via a secure digital network 12, e.g., internet. The system includes a database management system (DBMS) 14 that maintains detailed data relating to space projects, including tiered level of program parameters, as discussed in detail below. The system users and data sources can include any number of different stakeholders in the space industry to include research and development personnel, designers, project managers, schedulers, educators, government professionals, among others. More particularly, the system enables project managers, whether government or civilian, to fulfill mission planning requirements by leveraging opportunities for matching with other space missions for attaining mission goals, while minimizing scheduling, design, and budgeting risks, among others. The system also provides special attention to protecting user data. Much of the information on payload, spacecraft, and launch vehicle capabilities and available capacity is considered proprietary. The system allows users to specify which information is available to other users of the system, thus providing a tailored security posture based on each user's needs.

The matching module 16 utilizes a protocol of requirements that the user can categorize as Level 1 or Level 2 in terms of ability to trade the requirements in order to conduct a match-priority valuation. For example, a project manager can input the desired parameters for a mission match, such as matching hosted payload to a host spacecraft. The system will provide the prioritized list of host-spacecraft opportunities in a ranked order of preference, based on the desired parameters provided. In this manner, the system enables users to quickly identify opportunities for matching with other users to accomplish mission requirements.

The system platform 10 further includes a costing module 18 to provide a comprehensive picture for mission planning purposes. The costing module can conduct a financial analysis for the proposed match generated by the matching module 16. Based upon the results, the user can make an assessment as to whether the proposed match fits budgetary constraints. If it does not, then the user can review other opportunities for potential matches. If the cost estimate is within budgetary constraints, then the user can pursue further analysis of the potential match.

The system platform 10 further includes a feasibility module 20 and a schedule risk module 22. The feasibility module 20 conducts a more detailed analysis of system parameters, with Level 1 or Level 2 priority as defined by the user to trade hard (must have) and soft (nice-to-have) requirements for program planning purposes. The schedule risk module 22 assigns a risk level to the mission based on the potential hosts required payload delivery date, desired contract lead time and launch date.

Figure 2:
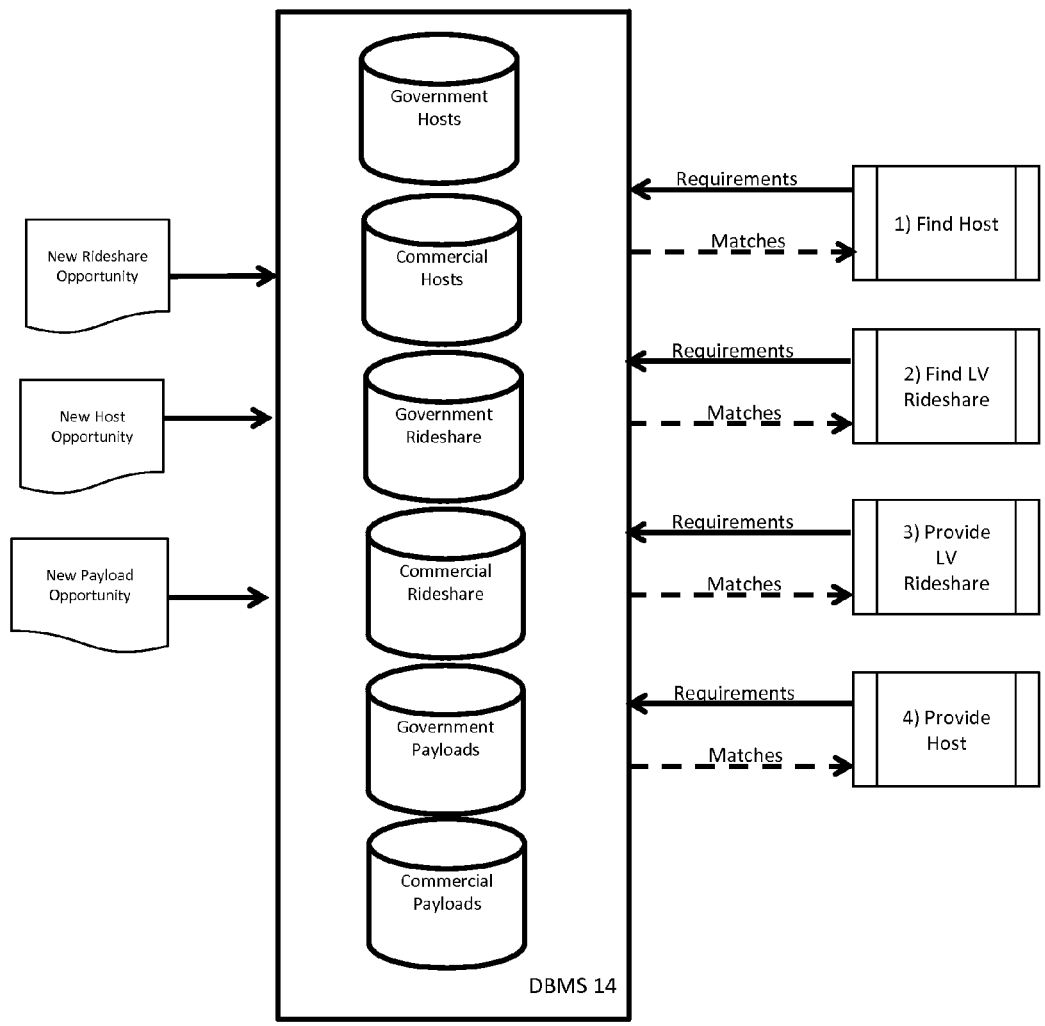
FIG. 2 is a simplified block diagram of database management system (DBMS) of the system of FIG. 1.

With reference now to FIG. 2, there is shown a simplified block diagram of database management system (DBMS) 14 of the system. The DBMS maintains detailed data relating to space projects. The DBMS enables users to access and provide schedule information, opportunity parameters, and other data. The data can include parameters relating to spacecraft (e.g., satellites), hosted payloads, launch vehicles, rideshare launches, including commercial and government. The data parameters can contain information relating to scheduling, financial, mission, technical, and other programmatic data.

Alternatively, it will be appreciated that data of the DBMS can be combined into different database configurations in other embodiments of this invention. Additional information regarding these databases will be discussed throughout this description. The data stored on the data storage assembly can be read, written, and executed by the various components, servers and modules included in the system.

Figure 3:
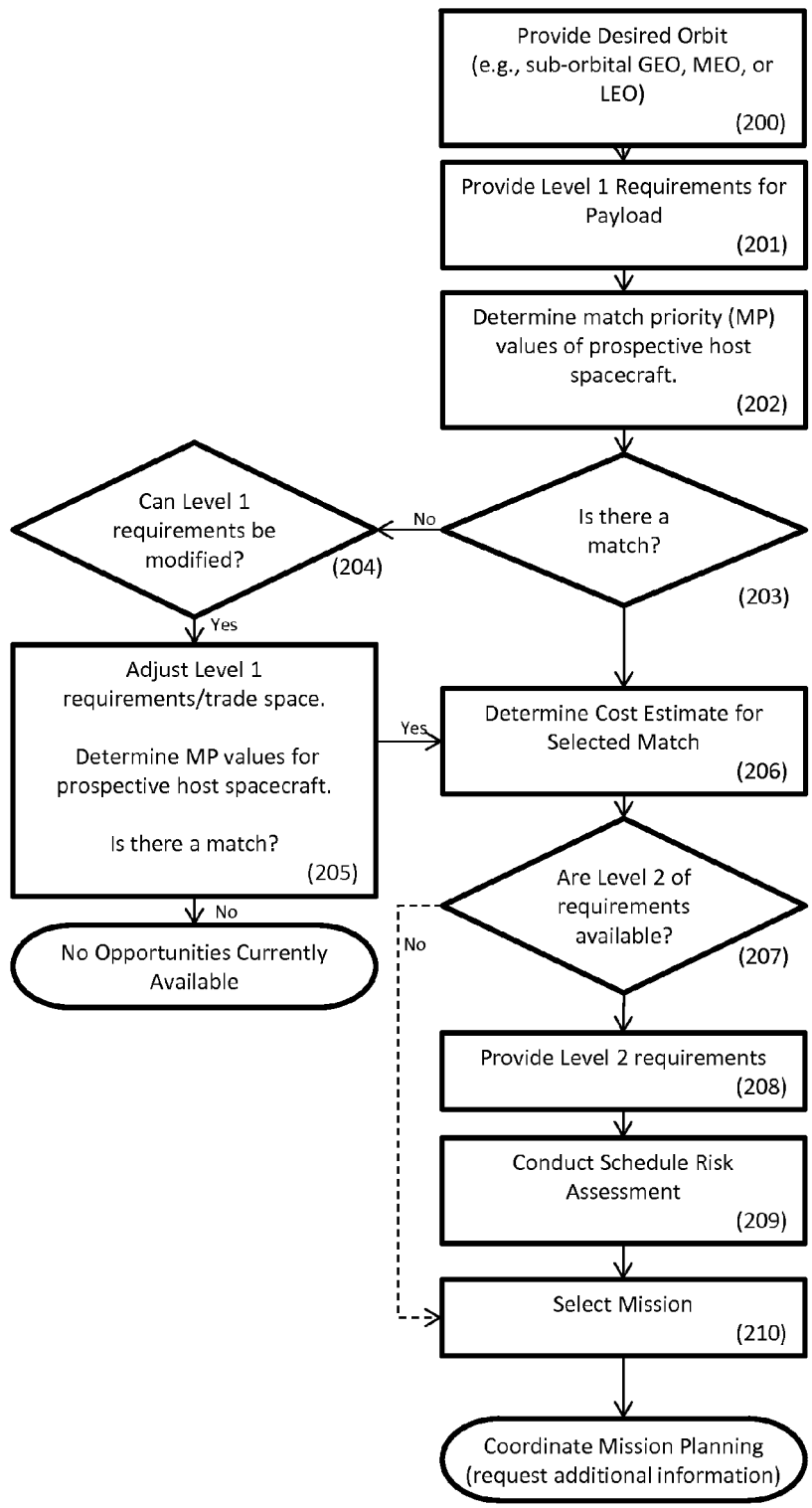
FIG. 3 is an exemplary flowchart illustrating an embodiment of this invention for matching of potential hosted payload with host spacecraft opportunities utilizing the system of FIG. 1, wherein a sequence of logical steps are shown for matching a hosted payload with host spacecraft opportunities.

With reference now to FIG. 3, there is shown an exemplary flowchart of a user identifying host spacecraft opportunities for hosted payload. The user identifies the desired orbit for the hosted payload, such as geostationary orbit (GEO), medium earth orbit (MEO), low earth orbit (LEO), or suborbital, step 200. The user further provides input for an extensive list of parameters for the payload, such as payload size (volume), payload mass, payload power requirements, and desired launch schedule (e.g., launch year), name of payload, payload manufacturer, country of origin (Nationality), owner, operator, average peak end of life power, high/low voltage, preferred type of orbit (e.g., elliptical, sun-synchronous, polar, deep highly eccentric), preferred longitude (GEO Only), preferred perigee, preferred apogee, preferred eccentricity, preferred inclination, preferred period, external payload volume, internal payload volume, preferred field of view, payload data downlink rate (Mbps), required downlink CONOPS (e.g., continuous, daily, weekly, monthly, etc.), payload data uplink rate (Mbps), required uplink CONOPS (e.g., continuous, daily, weekly, monthly, etc.), date design complete, date integration complete, date test complete, payload classification, payload mounting footprint, payload thermal control range (Celsius), internal volume thermal dissipation (Celsius per Watt), nominal pointing knowledge, pointing knowledge axis, pointing stability, slew rate, cooling system required, and data encryption required, step 201. At the same time, the user can define each requirement as Level 1 or Level 2. The system provides a prioritized list of prospective host spacecraft opportunities, utilizing a match priority algorithm.

Matching Module.

In the exemplary embodiment, the matching module 16 accounts for several primary parameters in calculating a match priority, step 202. More particularly, the system utilizes "Level 1" requirements in a prescribed formula to calculate an overall match priority value (MP). This value aids in providing a ranked, prioritized list of potential matches for further investigation. Level 1 requirements can include, but are not limited to parameters such as preferred orbit, average payload power required, payload size (volume), payload mass, required on-orbit date, preferred field of view (For GEO), mission design life, and launch schedule. In the exemplary embodiment, the match priority calculation is as follows:

$$MP=MP(S)+MP(W)+MP(P)+MP(Sc)$$

For example, in assessing the prospects of matching a hosted payload A with a host satellite B, the matching module utilizes the respective parameters for size, weight, power, and launch schedule to determine match priority values for each of these requirements: match priority for size (MP(S)), match priority for weight (MP(W)), match priority for power (MP(P)), and match priority for schedule (MP(Sc)). These match priority indicators are assigned prescribed values based upon requirements set by the requester and corresponding parameters for the prospective match, as discussed below. Each of these match priority indicators is assigned a value based upon the proximity of the respective parameters for the hosted payload and the host spacecraft. By way of illustration, and not limitation, an exemplary set of weighting algorithms for assigning values for each of match priority indicators is discussed below.

MP(S) is representative of prioritized match value for payload size (volume). If the payload volume ($P_{vol}$) is not within 10 percent of the target's volume availability ($T_{vol}$), then this value is set to zero. If payload volume ($P_{vol}$) is equal to or less than 10% of the target volume availability ($T_{vol}$) then this value is set at 12.5. If the payload volume ($P_{vol}$) is equal to or less than the target's volume availability ($T_{vol}$), then this value equals 25. The aforementioned can also be stated as follows:

if $P_{vol} \neq T_{vol} \pm 10\%$, then MP(S)=0;
if $P_{vol}$ is $T_{vol} < P_{vol} \leq (1.1\ T_{vol})$, then MP(S)=12.5;
if $P_{vol}$ is $(0.9\ T_{vol}) \leq P_{vol} \leq T_{vol}$, then MP(S)=25.

MP(W) is representative of a prioritized match value for payload weight (mass). If the payload mass ($P_{mass}$) not equal to the target's mass availability ($T_{mass}$) within ±10 percent, then this value is set to zero. If payload size is equal to or less than 110% of the target mass availability then this value is set at 12.5. If the payload size is equal to or less than the target's mass availability, then this value equals 25. The aforementioned can also be stated as follows:

if $P_{mass} \neq T_{mass} \pm 10\%$, then MP(W)=0;
if $P_{mass}$ is $T_{mass} < P_{mass} \leq (1.1\ T_{mass})$, then MP(W)=12.5;
if $P_{mass}$ is $(0.9\ T_{mass}) \leq P_{mass} \leq T_{mass}$, then MP(W)=25.

MP(P) is representative of a prioritized match value for payload power requirements (watts). If the payload power requirement ($P_{power}$) is not within 10 percent of the target's available power ($T_{power}$), then this value is set to zero. If payload power requirement is equal to or less than 10% of the target's available power then this value is set at 12.5. If the payload power requirement is equal to or less than the target's available power, then this value equals 25. The aforementioned can also be stated as follows:

if $P_{power} \neq T_{power} \pm 10\%$, then MP(P)=0;
if $P_{power}$ is $T_{power} < P_{power} \leq (1.1\ T_{power})$, then MP(P)=12.5;
if $P_{power}$ is $(0.9\ T_{power}) \leq P_{power} \leq T_{power}$, then MP(P)=25.

MP(Sc) is representative of a prioritized match value for scheduled or desired launch schedule (launch year)($T_{schd}$). If the payload's desired launch year ($P_{schd}$) is not within +3 years or minus one year of the target's launch year ($T_{schd}$), then this value is set to zero. If payload's desired launch year ($P_{schd}$) is within three years or minus one year of the targets launch year ($T_{schd}$), then this value is set at 20. If the payload's desired launch year equals the target's launch year, then this value is set at 25. The aforementioned can also be stated as follows:

if $(T_{schd}-1\ yr.) \leq P_{schd} \leq (T_{schd}+3\ yrs.)$, then MP(Sc)=25;
if not $(T_{schd}-1\ yr.) \leq P_{schd} \leq (T_{schd}+3\ yrs.)$, then MP(Sc)=0.

| Hosted Payload | Host Satellite A | Host Satellite B | Host Satellite C |
| --- | --- | --- | --- |
| .10 m³ (Size) | .20 m³ (available) | .05 m³ (available) | .10 m³ (available) |
| 50 kg. (mass) | 100 kg. (available) | 10 kg. (available) | 50 kg. (available) |
| 100 watts (power rqr'd) | 200 watts (available) | 10 watts (available) | 50 watts (available) |
| 2019 | 2019 | 2019 | 2020 |
| MP | 100 | 25 | 50 |

With continued reference to FIG. 3, if none of the host satellite opportunities result in a 100 percent match of Level 1 requirements, then the system enables the user to adjust the provided Level 1 requirements and/or adjust the trade space i.e. percent variations, of the aforementioned parameters to accommodate particular project needs, steps 204, 205. For example, particular hosted payloads may have an absolute minimum requirement for payload size whereas it may have additional flexibility in designing power requirements and/or launch schedule. In this scenario, the user could set an absolute minimum trade space for the match priority for size MP(S), while having a larger trade space set for the match priority for power MP(P) and the match priority for schedule MP(Sc).

In the exemplary embodiment, the trade space range can be expanded, e.g., the trade space range initially used was ±10%, which could then be expanded to a broader range such as ±20%. In the exemplary embodiment, the system enables the user to manually implement broader trade space range; however, the system can provide the defaults the expanded range without departing from the invention. Thereafter, the matching module 16 reassesses the prospective opportunities from the data of DBMS 14 providing a prioritized list with assigned MP values, which are presented to the user. If a satisfactory match is found then the system proceeds to provide a cost estimate for the match, step 206. Thus, the matching module 16 accounts for many factors in multiple levels of relationships in a manner that would not be readily apparent to a user.

Costing Module.

At Step 206, the costing module 18 of the system determines a rough order magnitude (ROM) cost estimate for mission pricing, utilizing a cost estimate algorithm that relies upon several criteria, a.k.a., cost estimating relationship (CER), set at weighted percentages. The CERs can be set solely upon Level 1 requirements, such as, those defined by the user in previous steps above.

For purposes of illustration, and not limitation, the following example is based upon six CERs, namely, mass, power, mission life, nationality, orbit, and complexity (e.g., low, medium, high scale). Cost estimating relationships (CERs) enable the system to associate a cost estimate based on each criteria. For example, the user can insert the values for their payload mission, such as Mass: 106 KGs, Power: 180 Watts, Mission Life: 15 yrs, Nationality: USA, Orbit: LEO, and Complexity: Medium (Low, Med, High scale). These CERs/criteria would determine a cost estimate ($ USD) based on comparable payload mission data. The output would give the user a cost estimate based on average and comparable prices per KGs, prices per Watts, prices per Mission Life years, etc. Hypothetically if the determined price per KG was $570K in this category, and the user inputs 106 KGs, than the cost estimate portion for Mass solely would be $60.4M. Each CER is given a weighted value for its project percent contribution to the overall cost estimate.

The system then utilizes cost factors for each of the CERs, which are summed together at their respective weighted contributions. The system can utilize industry averages or the user can provide cost factors directly. For example, the contribution of mass to the cost estimate equals payload times the "average cost per kilogram." This value would be given a weighted contribution towards the total cost estimate.

The contribution of power to the cost estimate would equal payload power requirement times the average cost per watt. The resulting value to be given a weighted contribution towards total cost estimate.

The contribution of the mission life CER would equal the payloads anticipated mission life times the average cost per mission life year. The resulting value would be given a weighted contribution towards the total cost estimate.

The CER for nationality would contribute towards the total cost estimate based upon the cost factor assigned for each respective nationality. In the exemplary embodiment, the 'Nationality' cost contribution is determined from historical comparable payload data. Due to various reasons, such as available technology, government regulation, or payload/launch volume, some countries/nations have had much higher average launch costs. For example, Sweden has one of the most expensive payload launch costs in the world, almost double that of the USA based on historical comparable data.

The contribution of the CER for orbit can be based upon an average cost for the selected orbit. For example, a GEO orbit will have a contrasting average cost factor when compared to a LEO orbit. The resulting value is assigned a weighted contribution towards total cost estimate.

The contribution of the CER for complexity can be based upon a multiplying factor of an additional cost for the complexity level of the payload or host spacecraft. The resulting value is assigned a weighted contribution towards the total cost estimate, in the exemplary embodiment.

Subsequent cost variables, or secondary CERs can also be input if available or known. These subsequent variables can be considered in a cost estimate, after the population of the primary six CERs, previously discussed. For example, these variables can include the following: competition, insurance, and change order fees post CDR. The competition variable has two parts: (1) competition for new contract awards and (2) sole source awards for a reproduction contract. Competing a 'new' contract among more than one vendor would substantially benefit costs, as opposed to sole sourcing this new contract to one vendor. Additionally, a contract sole sourced to a repeat vendor for a 'reproduction' contract would also considerably benefit costs based on learning curve, as opposed to competing this reproduction contract to multiple different vendors. The insurance variable is a price addition, added to the total cost estimate. Change order fees, post CDR include a price increase made after CDR. Example: change order fee before CDR $100K, after $175K. Competition, insurance, and change order fees post CDR are subsequent variables, which were established on the same principles as our initial, primary six CERs: from weighted values based on historical comparable payload data. These subsequent variables are assigned a fixed, weighted contribution towards the total cost estimate. Although these subsequent variables are less imperative, they are included to benefit the user and end product.

Cost estimate factors can be derived from a compiled list of historical payload cost comparisons, price points, correlations, trends and averages. Cost estimate factors can decline in price over time due to efficiencies in the industry.

Optimally, the system is provided with values for all of the CERs. However, if the user does not have all of the information for the required CER's, then the process module reassigns the weighted contribution across the known CER based upon their respective weighted percentages, utilizing the percentage absorption conversion formula in which the original CER percentage is divided by the sum of criteria percentages (based upon the original percentage values). For example, if a user has criteria for mass and power but no criteria for the remaining CER's then the cost estimate module would redistribute the relative cost to mass and power as follows: CER for mass would be assigned a corresponding, weighted percentage and the CER for power would be assigned the additional weighted percentage.

The system reports the ROM cost estimate results to the user. The cost estimate can include a detailed breakdown of cost components for various segments of the mission such as ground segment, space segment, and program management, across the mission life cycle.

Feasibility Module.

Upon completion of the cost estimate, the feasibility module 20 of the system vets the prospective match by conducting a feasibility assessment based upon detailed parameters, steps 207 and 208 (FIG. 3). The feasibility module 20 conducts a more detailed analysis of Level 2 system parameters, to validate the feasibility of the prospective match.

In the exemplary embodiment, the user inputs the parameters for the Level 2 requirements if not accomplished already. The feasibility module retrieves the corresponding requirements from the DBMS 14 and conducts a comparative analysis of the parameters for the proposed match. The system thereafter reports a feasibility assessment to the user that can include a detailed assessment that flags any issues, inconsistencies, or incompatibilities in determining impact of feasibility of the proposed match. This step is another opportunity to input additional values to further refine the match.

Schedule Risk Module.

Upon completion of the feasibility assessment, the schedule risk module assesses the risk of a successful completion of the mission based upon the development and launch schedule of the prospective match. More particularly, the schedule risk assessment results in a risk level assignment, e.g., though medium or high based upon scheduled dates such as required payload delivery date and the plan launch date.

In the exemplary embodiment, the payload delivery date to the launch vehicle is at least six months prior to the host planned launch date, then the mission is a side of you schedule risk of low. The payload delivery date is less than six months but greater than three months prior to the planned launch date, then the mission is assigned a schedule risk of medium. If the payload delivery date is less than three months prior to the planned launch date, then the mission is assigned a schedule risk of high. The resulting schedule risk assessment is reported to the user.

Based upon the outputs from the matching module, the costing module, the feasibility module, and scheduling risk module, the system can provide an overall assessment of the prospective match. In this manner, the user has comprehensive analysis of the prospective match sufficient for planning and coordination. Thus, the relevant players can be confident to proceed through to successful execution of the coordinated mission. Whether match relates to 1) matching hosted payload and host spacecraft, or 2) matching spacecraft and launch opportunities, to include rideshare opportunities.

Figure 6:
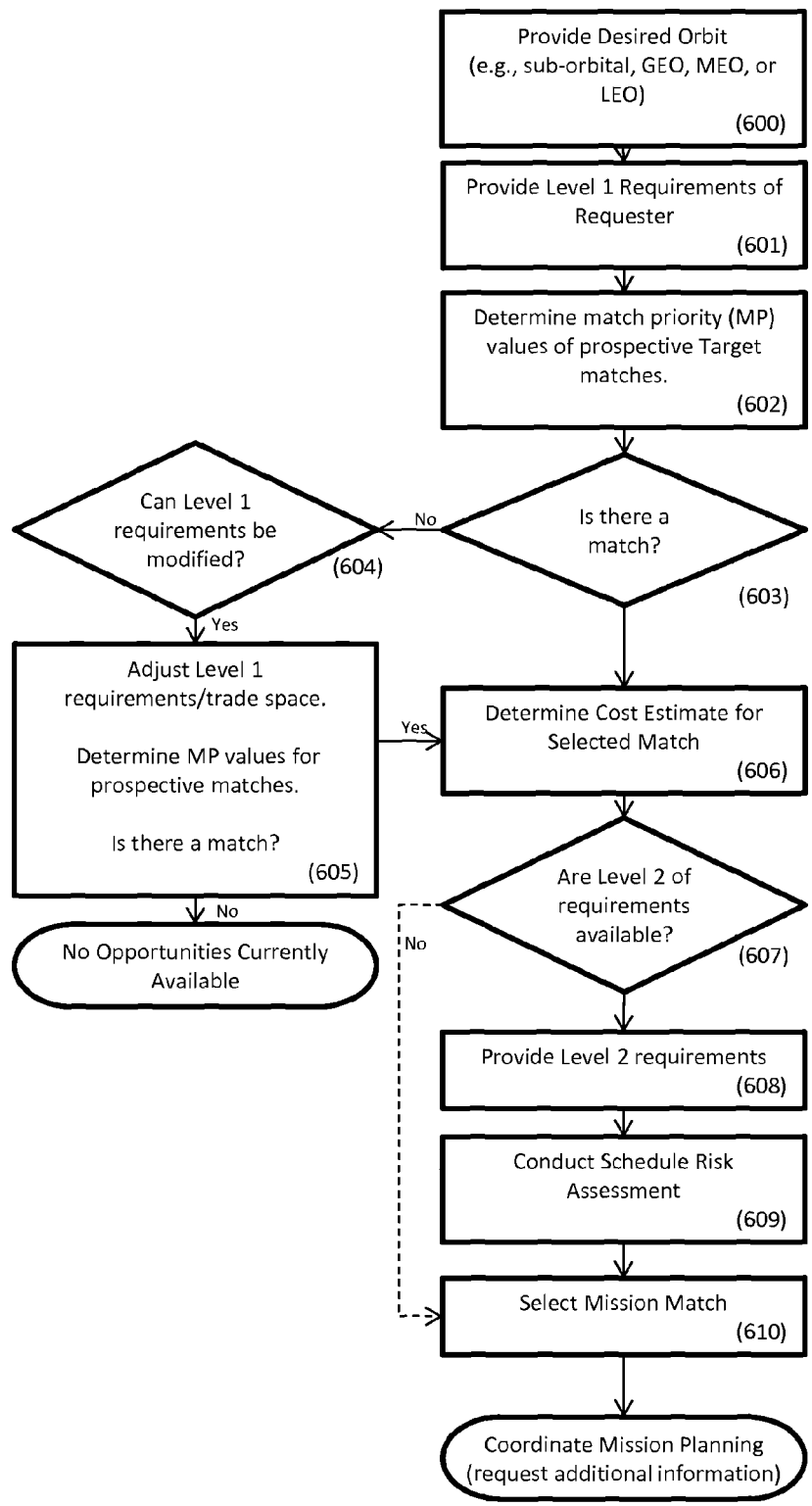
FIG. 6 is an exemplary flowchart illustrating an embodiment of this invention for matching and hosted payload with host spacecraft opportunities utilizing the system of FIG. 1, wherein a sequence of logical steps are shown for matching spacecraft and launch opportunities, to include rideshare opportunities.

With reference now to FIG. 6, there is shown an exemplary flowchart for a user to identify matching spacecraft and launch opportunities, including rideshare. The flowchart is similar to the steps discussed above with respect to FIG. 3.

At step 600, the user identifies the desired orbit for the hosted payload, such as geostationary orbit (GEO), medium earth orbit (MEO), low earth orbit (LEO), or suborbital. The user further provides parameters for the payload using a predefined list, such as payload size (volume), payload mass, launch location, nationality, and launch schedule (e.g., launch year), step 601. At the same time the user will designate Level 1 or Level 2 requirements. Level 1 requirements can include, but are not limited to parameters such as preferred orbit, payload size (volume), payload mass, required on-orbit date, nationality (US or Foreign), and preferred launch location (CONUS or OCONUS).

At step 602, the matching module 16 conducts match priority calculations, utilizing user-defined Level 1 requirements in a prescribed formula to calculate a match priority value (MP), as follows:

$$MP=MP(S)+MP(W)+MP(L)+MP(N)+MP(Sc)$$

For example, in assessing the prospects of matching spacecraft and launch opportunities. The matching module utilizes the respective parameters for size, weight, power, nationality, and launch schedule to determine match priority values for each of these requirements: match priority for size (MP(S)), match priority for weight (MP(W)), match priority for power (MP(P)), match priority for nationality (MP(N)), and match priority for schedule (MP(Sc)). These match priority indicators are assigned prescribed values based upon requirements set by the requester and corresponding parameters for the prospective match, as discussed below. Each of these match priority indicators is assigned a value based upon the proximity of the respective parameters for spacecraft and launch vehicle. By way of illustration, and not limitation, an exemplary set of weighting algorithms for assigning values for each of match priority indicators is discussed below.

MP(N) is representative of prioritized match value for nationality of launch. If the payload nationality and the launch vehicle nationality do not match, then MP(N) equals 0. If the payload nationality and the launch vehicle nationality match, then MP(N) equals 12.5. This applies to US-built payloads only, if the payload is non-US then MP(N) always equals 12.5.

At step 603, if none of the host satellite opportunities result in a 100 percent match of Level 1 requirements, then the system enables the user to adjust the Level 1 requirements and/or adjust the trade space i.e. percent variations, of the aforementioned parameters to accommodate particular project needs, steps 604, 605. If a satisfactory match is found then the system proceeds to provide a cost estimate for the match, step 606.

At Step 606, the costing module 18 of the system determines a cost estimate for mission pricing, utilizing a cost estimate algorithm that relies upon several criteria, a.k.a., cost estimating relationship (CER), set at weighted percentages. The costing module can utilize any one of various costing profiles. For example, in a rideshare scenario, the cost model can be used to conduct an estimate for the primary payload. The result is then multiplied by a "rideshare" factor or weighted percentage and adding a rideshare fee.

Upon completion of the cost estimate, the feasibility module 20 of the system vets the prospective match by conducting a feasibility assessment based upon detailed parameters, steps 607 and 608 (FIG. 6). The feasibility module 20 conducts a more detailed analysis of user-defined Level 2 system parameters to validate the feasibility of the prospective match.

At step 610, upon completion of the feasibility assessment, the schedule risk module assesses the risk of a successful completion of the mission based upon the development and launch schedule of the prospective match. More particularly, the schedule risk assessment results in a risk level assignment, e.g., though medium or high based upon scheduled dates such as required payload delivery date and the plan launch date.

Based upon the outputs from the matching module, the costing module, the feasibility module, and scheduling risk module, the system can provide an overall assessment of the prospective match. In this manner, the user has comprehensive analysis of the prospective match sufficient for planning and coordination. Thus, the relevant players can be confident to proceed through to successful execution of the coordinated mission.

With reference again to FIG. 1, connections between components are shown using double-sided arrows, which may be physical, fiber optic, wireless, or any other type of communications link. The network 12 can be any of a variety of conventional network topologies and types (including optical, wired and/or wireless networks), using a variety of conventional network protocols (including public and/or proprietary protocols). The network 12 can include, for example, home networks, cellular networks, corporate networks, Intranet(s), or the Internet, as well as possibly at least portions of one or more local area networks (LANs) and/or wide area networks (WANs) or telephone networks, among others.

The client devices 24 may be any of a variety of digital devices, including, for example, and not limitation, a desktop PC, a notebook or portable computer, a workstation, an Internet appliance, a handheld PC, a cellular telephone or other wireless communications device, a personal digital assistant (PDA), a set-top box, or combinations thereof. Other hardware components capable of digitally communicating and interacting with the system can be used without departing from the invention.

The database management system DBMS 14 is configured to store the system information in digital format utilizing hardware known in the art, such as hard drive, random access memory, read only memory, flash memory, cache memory, a portable magnetic computer diskette, such as a floppy diskette, zip disk, and/or other configurations capable of storing programming, data, or other digital information on hardware devices, whether co-located or distributed across a network. Other hardware components capable of digitally communicating and interacting with the system can be used without departing from the invention.

The system, including modules 16, 18, 20 and 22, is arranged to process data, control data access and storage, issue commands, and control other desired operations. The system including processing circuitry configured to implement desired programming. For example, processing circuitry (hardware) may be implemented as one or more of a processor and/or other structure configured to execute executable instructions including, for example, software and/or firmware instructions, and/or hardware circuitry. Exemplary embodiments of processing circuitry include hardware logic, state machines, and/or other structures alone or in combination with a processor. Storage circuitry is configured to store programming such as executable code or instructions (e.g., software and/or firmware), electronic data, databases, or other digital information and may include processor-usable media. Processor-usable media may be embodied in any computer program, product(s), or article of manufacture(s) that can contain, store, or maintain programming, data, and/or digital information for use by or in connection with an instruction execution system including processing circuitry in the exemplary embodiment. Processing capability of the system can be co-located or distributed across a network without departing from the invention.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance if a flowchart as described below expressly or implicitly requires for example that a processor or storage for example be utilized, the applicable components described herein 4 may be so utilized even if not specifically recited for that step.

As will be appreciated by those of reasonable skill in the art, there are numerous embodiments to this invention, and variations of elements, steps and system components that may be used, all within the scope of this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computerized method for matching space launch vehicle, satellite, and payload opportunities, comprising:
receiving, at a network-based system, a plurality of technical and mission parameters from a requestor on a client device associated with a first user, for a requestor mission that is a payload, a spacecraft or a space launch vehicle, the plurality of technical and mission parameters for identifying mission match of (a) matching a hosted payload and a host spacecraft or vice versa or (b) matching a spacecraft and space launch vehicle or vice versa;

accessing parameters relating to a prospective mission match from a database management system (DBMS) within the network-based system, based upon the plurality of technical and mission parameters from the requestor mission;

determining, using one or more processors within the network-based system, a match priority (MP) value for the requestor mission and the prospective mission match, via a matching module that utilizes technical and mission parameters of the requestor mission and the prospective mission match, in which the parameters are user-defined into prioritized tiers, wherein the matching module assigns a value to matching parameters based upon a prescribed trade range;

assigning a target match associating the requestor mission and the prospective mission match, upon the accessing and determining step, if the MP satisfies a prescribed threshold;

transmitting data for target match (e.g., the match priority value, the cost estimate, the feasibility assessment, and the schedule risk assessment) to the first user.

2. The computerized method as recited in claim 1, wherein the matching module assigns a match-priority (MP) value for each parameter set by user (e.g. volume, mass, power requirements, and launch schedule).

3. The computerized method as recited in claim 2, wherein the matching module assigns a match-priority value for each matching parameters to determine the overall match priority value (MP), including a match value for payload size (volume), match value for payload weight (mass), and a match value for payload power requirements.

4. A computerized method for matching launch, satellite, and mission payload opportunities, comprising:

receiving, at a network-based system, a plurality of technical and mission parameters for a requestor mission from a client device associated with a first user, in which the requestor mission is a payload, a spacecraft or a space launch, the plurality of mission parameters for identifying mission match of (a) matching a hosted payload and a host spacecraft or (b) matching a spacecraft and space launch vehicle;

accessing parameters relating to a prospective mission match from a database management system (DBMS) within the network-based system, based upon the plurality of mission parameters from the requestor mission;

determining, using one or more processors within the network-based system, a match priority value (MP) for the requestor mission and the prospective mission match, via a matching module that utilizes mission parameters of the requestor mission and the prospective mission match, in which the parameters are categorized in prioritized tiers, wherein the matching module assigns a match priority (MP) value for matching parameters based upon a prescribed trade range to determine an overall match priority value (MP), including a match value for payload size (volume), match value for payload weight (mass), and a match value for payload power requirements; and transmitting data to the client device.

5. The computerized method as recited in claim 4, further comprising:

conducting a feasibility assessment for the target match, via a feasibility module, using one or more processors within the network-based system.

6. The computerized method as recited in claim 5, wherein the feasibility module utilizes parameters for type of orbit and thermal control range.

7. The computerized method as recited in claim 4, further comprising:

conducting a schedule risk assessment for the target match, via a schedule risk module, using one or more processors within the network-based system.

8. The computerized method as recited in claim 4, further comprising a costing module utilizing a cost estimating relationship (CER), set at weighted percentages based upon mission parameters for the target match.

9. A network-based system for matching of space launch, satellite and mission payload opportunities, comprising, within the network-based system network, a client device, database management system (DBMS), and one or more processors, in which the client device, comprising:

a matching module, including the one or more processors and the database management system (DBMS), in digital communication with the client device, that:

receives, a plurality of technical and mission parameters from a requestor on the client device associated with a first user, for a requestor mission that is a payload, a spacecraft or a space launch vehicle, the plurality of technical and mission parameters for identifying mission match of (a) matching a hosted payload and a host spacecraft or vice versa or (b) matching a spacecraft and space launch vehicle or vice versa, accesses parameters relating to a prospective mission match from the database management system (DBMS), based upon the plurality of technical and mission parameters from the requestor mission, determines, using the one or more processors, a match priority (MP) value for the requestor mission and the prospective mission match, via the matching module that utilizes technical and mission parameters of the requestor mission and the prospective mission match, in which the parameters are user-defined into prioritized tiers, wherein the matching module assigns a value to matching parameters based upon a prescribed trade range, assigns a target match associating the requestor mission and the prospective mission match, upon the accessing and determining step, if the MP satisfies a prescribed threshold, and transmits data for target match to the first user.

10. The network-based system as recited in claim 9, wherein the matching module assigns a match-priority (MP) value for each parameter set by user (e.g. volume, mass, power requirements, and launch schedule).

11. The network-based system as recited in claim 10, wherein the matching module assigns a match-priority value for each matching parameters to determine the overall match priority value (MP), including a match value for payload size (volume), match value for payload weight (mass), and a match value for payload power requirements.

12. The network-based system as recited in claim 9, further comprising:

a costing module, including the one or more processors and the database management system (DBMS), in digital communication with the client device, that conducts a cost estimate for the target match, using one or more processors within the network-based system, utilizing a cost estimating relationship (CER), set at weighted percentages based upon mission parameters for the target match; and a feasibility module, including the one or more processors and the database management system (DBMS), in digital communication with the client device, conducts a feasibility assessment for the target match, based upon parameters for type of orbit and thermal control range.

13. The network-based system as recited in claim 12, further comprising: a schedule risk module, including the one or more processors and the database management system (DBMS), that conducts a schedule risk assessment for the target match.

14. The computerized method as recited in claim 1, further comprising: conducting a cost estimate for the target match, via a costing module, using one or more processors within the network-based system.

15. The computerized method as recited in claim 4, further comprising: conducting a cost estimate for the target match, via a costing module, using one or more processors within the network-based system.

* * * * *